(12) United States Patent
Rice

(10) Patent No.: US 11,459,193 B1
(45) Date of Patent: Oct. 4, 2022

(54) MATERIAL HANDLING EQUIPMENT

(71) Applicant: EDGE INNOVATE (NI) LIMITED, Tyrone (IE)

(72) Inventor: Matthew Gerald Rice, Tyrone (IE)

(73) Assignee: Edge Innovate (NI) Limited, Dungannon (IE)

(*) Notice: Subject to any disclaimer, the term of this patent is extended or adjusted under 35 U.S.C. 154(b) by 0 days.

(21) Appl. No.: 17/302,911

(22) Filed: May 14, 2021

(51) Int. Cl.
| | |
|---|---|
| *B65G 65/28* | (2006.01) |
| *B65G 21/14* | (2006.01) |
| *B65G 21/12* | (2006.01) |
| *B65G 15/26* | (2006.01) |
| *B65G 41/00* | (2006.01) |

(52) U.S. Cl.
CPC .......... *B65G 65/28* (2013.01); *B65G 21/12* (2013.01); *B65G 21/14* (2013.01); *B65G 41/002* (2013.01); *B65G 41/008* (2013.01)

(58) Field of Classification Search
None
See application file for complete search history.

(56) References Cited

U.S. PATENT DOCUMENTS

| | | | | |
|---|---|---|---|---|
| 4,427,104 A * | 1/1984 | Reid, Jr. | ............... | B65G 41/002 198/313 |
| 6,129,196 A * | 10/2000 | Lapper | .................. | B65G 41/008 198/313 |
| 6,360,876 B1 * | 3/2002 | Nohl | ..................... | B65G 41/008 198/588 |
| 6,929,113 B1 * | 8/2005 | Hoover | .................. | B65G 21/14 198/588 |
| 7,448,486 B1 * | 11/2008 | Frankl | .................... | B65G 15/26 198/313 |
| 7,849,641 B2 * | 12/2010 | Johannsen | ............... | C09K 8/54 52/118 |
| 8,584,826 B2 * | 11/2013 | Smith | .................. | B65G 41/002 198/313 |
| 10,011,443 B2 * | 7/2018 | McCloskey | ........ | B65G 69/0408 |
| 2021/0016982 A1 * | 1/2021 | Forker | ..................... | B60P 1/36 |

FOREIGN PATENT DOCUMENTS

| | | |
|---|---|---|
| CA | 3 040 151 A1 | 7/2019 |
| GB | 1 514 340 A | 6/1978 |

OTHER PUBLICATIONS

EPO Extended European Search Report dated Jun. 17, 2020 for Application No. 19215146.2, 9 pages.

* cited by examiner

*Primary Examiner* — Kavel Singh
(74) *Attorney, Agent, or Firm* — Boisbrun Hofman, PLLC

(57) ABSTRACT

The present invention relates to a stacker for stockpiling bulk material, the stacker comprising: a chassis provided with either wheels or tracks; a conveyor; and a powered, telescoping cylinder leg for moving the conveyor with respect to the chassis, wherein the conveyor is at least 70 ft (21.3 m) long and wherein the telescoping cylinder leg is mounted at one end to the conveyor and at the other end is removably mountable to the chassis from a first, container transport position to a second, road transport position.

20 Claims, 5 Drawing Sheets

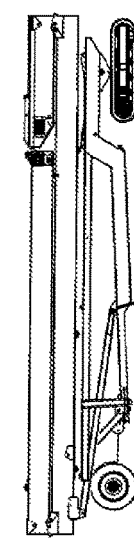
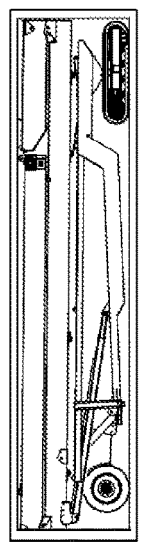
Figure 4a
Figure 4b
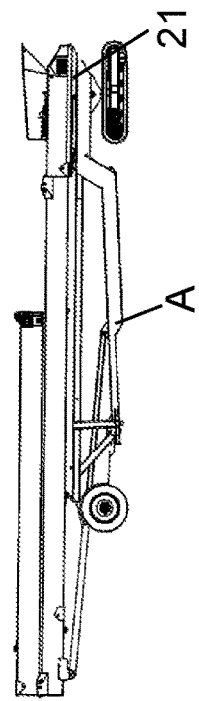
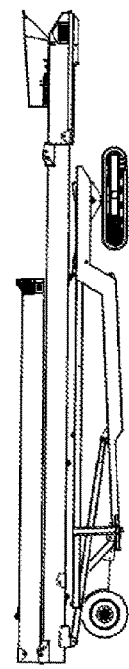
Figure 4c
Figure 4d
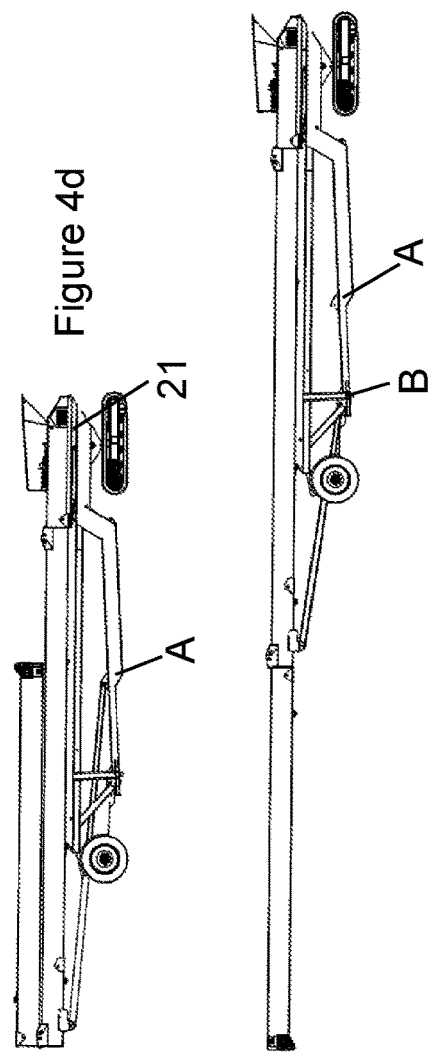
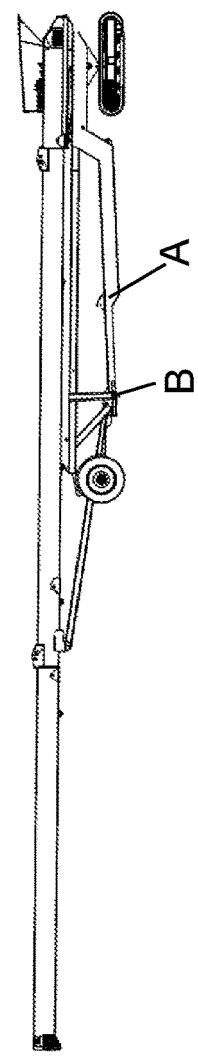
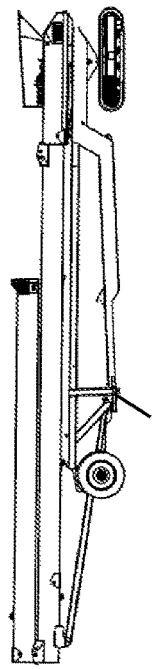
Figure 4e
Figure 4f
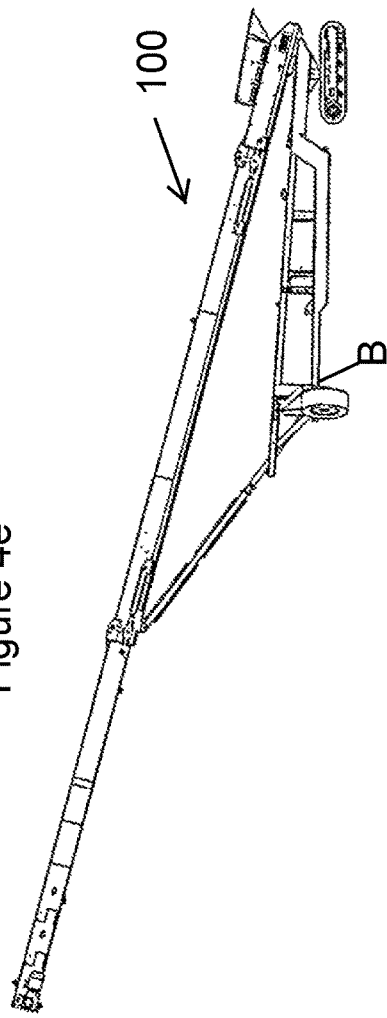
Figure 4g

MATERIAL HANDLING EQUIPMENT

MATERIAL HANDLING EQUIPMENT

The present invention relates to material handling equipment, in particular to mobile bulk material stackers that are transported in 40 ft shipping containers.

BACKGROUND TO THE INVENTION

Large machinery such as material handling equipment is constrained both by the need to be of a size that can travel by road and of a size that can be transported to a customer in one or more shipping containers.

Typical equipment used to handle bulk materials includes stockpiling machinery which may have radial ability and additionally may be mobile or tracked. For example, stackers are conventionally employed to stockpile bulk materials such as gravel, sand, grain, coal and aggregate. Radial stackers have conveyors which swing around in a radius to stockpile material in an arc, allowing substantially more material to be stacked than is possible using a conventional stationary stacker that permits only a conical stack. Telescoping conveyors also permit more material to be stacked as the conveyor is extended or retracted during stockpiling operations.

All stockpiling machinery typically includes a hopper at one end to accept material. The material then travels along a conveyor, usually on a belt, and is discharged at the other end of the stacker. Wheels or tracks are disposed between the hopper and discharge end of the stacking conveyor. These wheels or tracks permit the stacker to be manoeuvred around the work site. Typically, stackers may be folded over themselves and be ready for road transport, for example by low loader trailer, in relatively little time.

Transport of stockpiling machinery from manufacturer in one country to customer in another country typically takes place in shipping containers. Whilst conversion of such stockpiling machinery from working mode to road transport mode and vice versa is relatively simple, this is not the case for conversion from either of these modes to container transport mode.

Due to the working mode length that is required, prior art stackers are each individually packed into at least one shipping container in parts to be assembled by the customer. Lifting equipment such as cranes is required in order to pack these loose parts into the container and again to remove them prior to assembly. The process of disassembly and subsequent packing of prior art stockpiling machinery parts as well as the process of removing and reassembling these parts into either a mode suitable for road transport or a final working mode each take at least 24 hours and more typically up to 4 days.

It is a therefore an object of the present invention to provide a stockpiling machine with a conveyor of working length longer than 70 ft (21.3 m) and with a greatly reduced setup time of approximately one hour or less, wherein the stockpiling machine fits into a single container and, upon reaching its destination, can be deployed without the need for heavy duty lifting equipment such as cranes.

SUMMARY OF THE INVENTION

The present invention relates to a stacker for stockpiling bulk material, wherein the stacker has a conveyor longer than 70 ft (21.3 m) and is convertible from a transport mode in which it fits inside a 40 ft (12.2 m) shipping container to a working mode in approximately one hour or less and without the need for heavy lifting equipment such as cranes.

Accordingly, a first aspect of the present invention is a stacker for stockpiling bulk material, the stacker comprising: a chassis provided with either wheels or tracks; a conveyor; and a powered, telescoping cylinder leg for moving the conveyor with respect to the chassis, wherein the working length of the conveyor is at least 70 ft (21.3 m) long, and wherein the telescoping cylinder leg is mounted at one end to the conveyor and at the other end is removably mountable to the chassis from a first mounting position for transport of the stacker in a shipping container to a second mounting position for transport of the stacker by road.

The stacker according to the invention fits inside a single 40 ft shipping container. This provides significant advantages over prior art machinery which require disassembly to be packed into a container. The stacker according to the invention easily transforms from container mode to road transport mode and vice versa. The time to setup for the end user is thus greatly reduced and the build procedure is safer as there are less steps. Additional equipment such as a crane is not required in order to pack the machine into the container, nor to remove the machine from the container, nor for transformation of the machine from container mode to transport mode or working mode. This substantially reduces costs. In order to transform the machine from transport mode to a working setup, the only tools required are general hand tools such as a hammer, pinch bar, spanners and the like.

The conveyor is configured to carry bulk material along an elevating path from a low position adjacent one end of the chassis, preferably a rear end, to a higher position adjacent the other end of the chassis, preferably a front end.

In a preferred embodiment, the conveyor is at least approximately 75 ft long, particularly preferably at least approximately 78 ft long, e.g. approximately 100 ft long.

The conveyor is preferably a folding conveyor, that is the conveyor preferably comprises two or more sections which pivot with respect to each other such that the conveyor may be folded over itself for storage, particularly preferably wherein the conveyor further comprises a fold linkage for powering this pivot action, i.e. for unfolding of the conveyor, folding of the conveyor, or both. For example, the conveyor preferably comprises at least a head section and a tail section and, when unfolded, is designed to carry bulk material along an elevating path from a low position adjacent the tail section, to a higher position adjacent the head section.

The conveyor preferably has a telescoping section, particularly preferably the conveyor is a folding conveyor with a telescoping section, e.g. a telescoping head section.

In a preferred embodiment, the front end of the chassis is provided with wheels, particularly preferably wherein a continuous track system is located at a rear end of the chassis, the continuous track system having a pair of driven, parallel tracks.

In another preferred embodiment, the chassis is provided with a continuous track system, particularly preferably toward the middle of the chassis.

The telescoping cylinder leg preferably includes at least one hydraulic ram for increasing and decreasing the effective length of the leg, particularly preferably two hydraulic rams. However, this is not to be considered limiting and other means of effecting telescopic movement such as an electric actuator, mechanical jack etc. may be used in addition to or instead of a hydraulic ram.

For transport in a shipping container, the telescoping cylinder leg is mounted to the chassis in the first mounting position, preferably by pinning with one or more bolts or pins. This allows the overall length of the machine to be compressed to within the limits of a single shipping container. When mounted in this position, the conveyor is preferably in a substantially horizontal position.

Furthermore, when mounted in this first mounting position, the telescoping cylinder leg can be extended to slide the conveyor forwards with respect to the chassis or retracted to slide the conveyor backwards with respect to the chassis. The first mounting position is preferably located towards the centre of the chassis.

In order to transform the stacker from container mode to road transport mode, once the stacker has arrived at its destination, it is removed from the container, preferably using its own power. For example, if the stacker is a tracked stacker it may be tracked out of the container. Alternatively, for example if the stacker is a mobile stacker, i.e. wheeled rather than tracked, it may be towed out of the container using a self-propelled vehicle such as a forklift truck, lorry or the like. A hopper or other feed system may be mounted to the stacker at this time.

When the stacker has been removed from the container and the telescopic leg is still mounted in the first mounting position, the telescopic leg is extended, moving the conveyor forward such that the total length of the machine increases. The conveyor is then preferably fixed to the chassis, for example by pinning or bolting, to provide a pivot point, e.g. at the rear end of the chassis.

In order to transform the stacker into working mode, for example for use of the stacker at a site such as a quarry, the telescoping cylinder leg is mounted in the second mounting position. When mounted in this position, the telescoping cylinder leg can be extended to raise the conveyor to one or more different working angles. The second mounting position is preferably located towards a front end of the chassis such that the telescopic leg will have sufficient power to raise and lower the conveyor for everyday use. For example, for mobile stackers with wheels at the front end of the chassis, the second mounting position is preferably adjacent the wheels and for tracked stackers with tracks at the front end of the chassis, the second mounting position is preferably adjacent the tracks.

In another preferred embodiment, the conveyor comprises a head section, a mid section and a tail section. In this embodiment, the head section and mid section of the folding conveyor are connected to each other such that the head section can pivot with respect to the mid section, particularly preferably wherein the conveyor further comprises a head fold linkage for powering this pivot action, e.g. for unfolding and folding of the head section of the conveyor. Additionally, the tail section and mid section of the folding conveyor are connected to each other such that the tail section can pivot with respect to the mid section, particularly preferably wherein the conveyor further comprises a tail fold linkage for powering this pivot action, e.g. for folding and unfolding the tail section of the conveyor.

Additionally, or alternatively, the mid section of the folding conveyor is preferably approximately the same length as the combined length of the head and tails sections. In a particularly preferred embodiment, the length of the head section of the folding conveyor is approximately 28 ft 8" (8.75 m), the tail section is approximately 10 ft 2" (3.1 m) and the mid section is approximately 39 ft (11.9 m). However, this is not to be considered limiting and the mid section may be shorter or longer than the combined length of the head and tails sections. For example, longer conveyors can be accommodated by overlapping the head and tail sections on top of the mid section or by including telescoping sections.

In a preferred embodiment, the stacker further comprises a power unit such as an engine. In this embodiment, the first mounting position is preferably located in front of the power unit for weight distribution purposes.

BRIEF DESCRIPTION OF THE DRAWINGS

Certain preferred embodiments of the present invention will now be described, by way of example only, with reference to the accompanying drawings in which:

FIGS. 4a to 4g show the steps required to change a stacker according to the invention from the 40 ft shipping container mode as shown in FIG. 3 to the working mode shown in FIG. 2;

DETAILED DESCRIPTION

Figure 1:
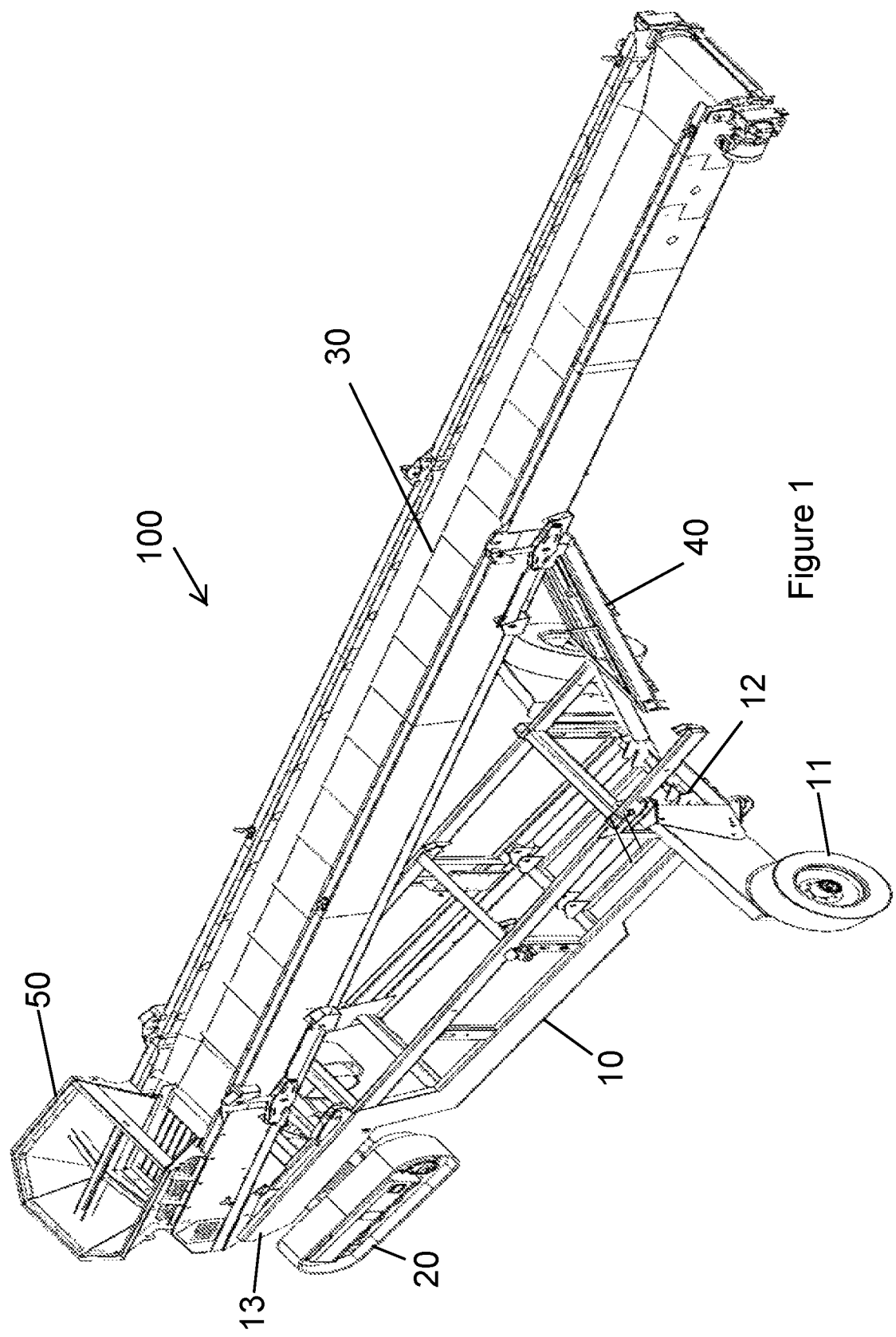
FIG. 1 shows a perspective view of a preferred embodiment of a tracked, portable stacker according to the invention in working mode.

Various embodiments of the present invention will be described in detail with reference to the drawings, where like reference numeral represent like parts and assemblies throughout the several views.

Figure 2:
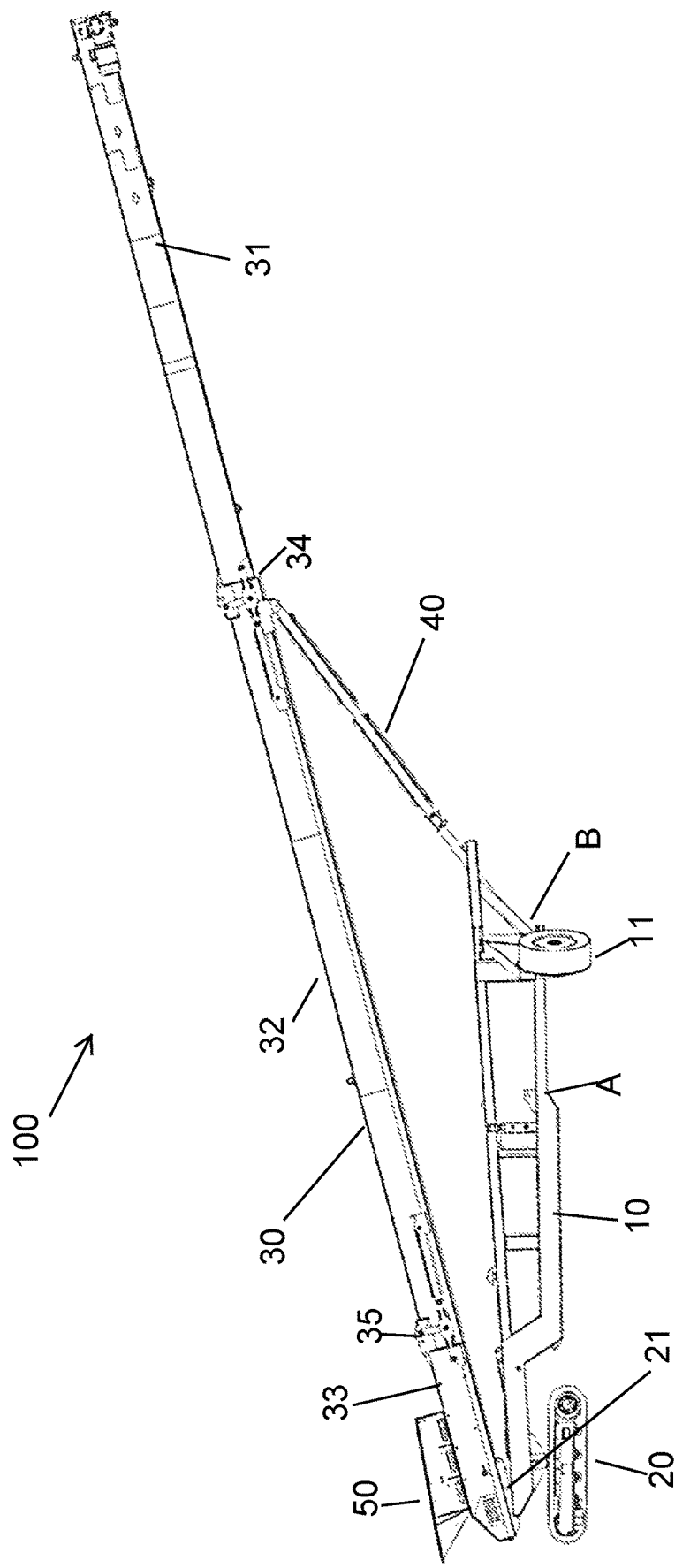
FIG. 2 shows a side view of the stacker shown in FIG. 1.

Referring to the drawings, FIGS. 1 and 2 show a preferred stacker according to the invention, generally referred to herein by reference numeral 100, in working mode. As shown in FIGS. 1 and 2, stacker 100 is a portable radial stacker for stockpiling bulk material and comprises a chassis 10 with two wheels 11 at front end 12 of chassis 10 and continuous track system 20 at rear end 13 thereof.

Folding conveyor 30 is mounted to chassis 10 and has head section 31, mid section 32 and tail section 33. Folding conveyor 30 is designed to carry bulk material along an elevating path from tail section 33 to head section 31. Hopper 50 is shown mounted to tail section 31 in FIGS. 1 and 2.

Head section 31 and mid section 32 are connected to each other such that head section 31 can pivot with respect to mid section 32. In the preferred embodiment shown in FIGS. 1 and 2 conveyor 30 further comprises head fold linkage 34 for powering this pivot action, i.e. for unfolding and folding of head section 31.

Tail section 33 and mid section 32 are connected to each other such that tail section 33 can pivot with respect to mid section 32. In the preferred embodiment shown in FIGS. 1 and 2 conveyor 30 further comprises tail fold linkage 35 for powering this pivot action, i.e. for folding and unfolding tail section 33.

Powered, telescoping cylinder leg 40 is mounted at one end to the underside of conveyor 30 at the end of mid section 32 adjacent head section 31. The other end of telescoping cylinder leg 40 is removably mountable to chassis 10 from first mounting position A located towards the centre of chassis 10 to second mounting position B located at front end 12 of chassis 10 adjacent wheels 11. Preferred telescoping cylinder leg 40 is shown in detail in FIGS. 5a and 5b.

Figure 5A:
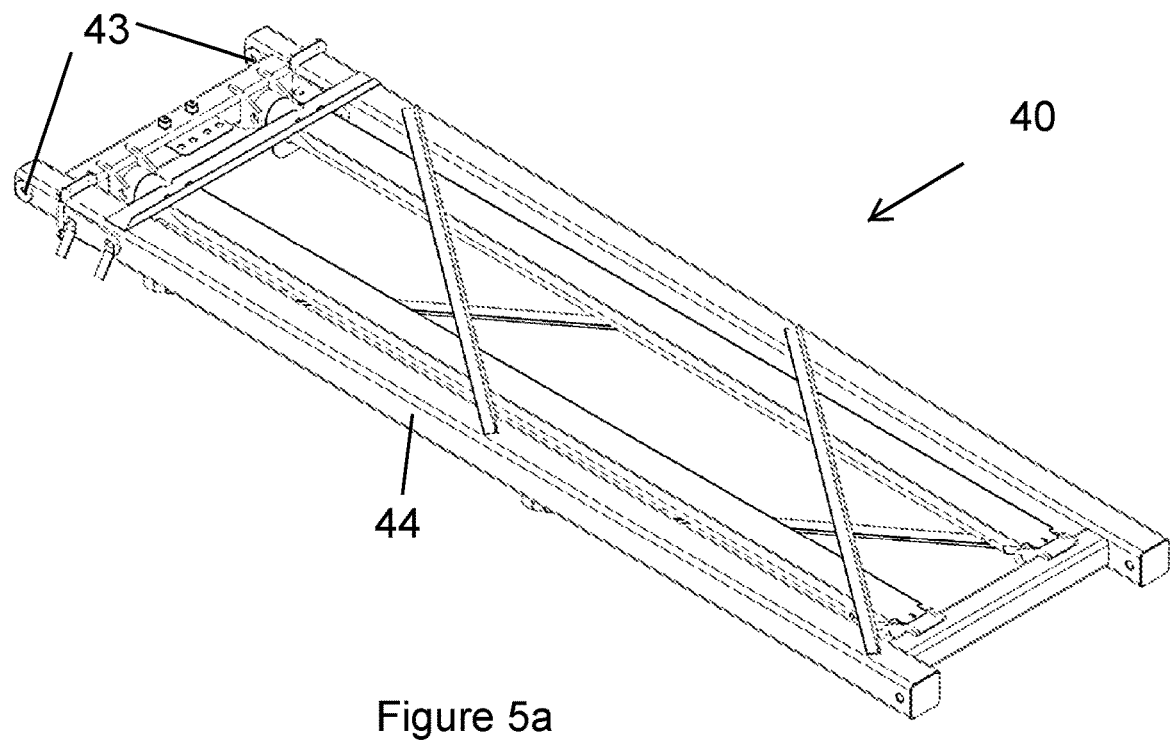
FIG. 5a shows a preferred telescopic leg in the retracted position.
Figure 5B:
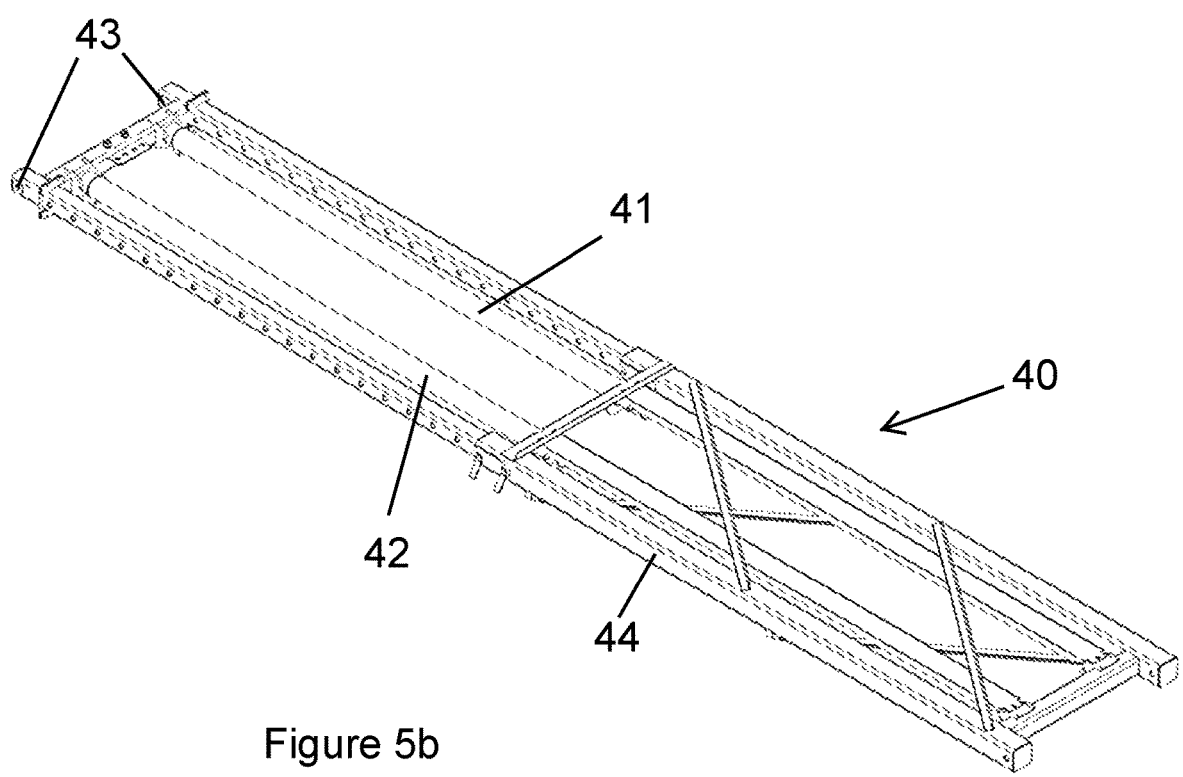
FIG. 5b shows the telescopic leg of FIG. 5a in the extended position.

In the preferred embodiment shown in FIGS. 5a and 5b, telescopic cylinder leg 40 comprises two parallel rams 41, 42 within frame 44. Apertures 43 at one end of frame 44 are for accepting pins for mounting leg 40 to chassis 10 at mounting position A or B.

Figure 3:
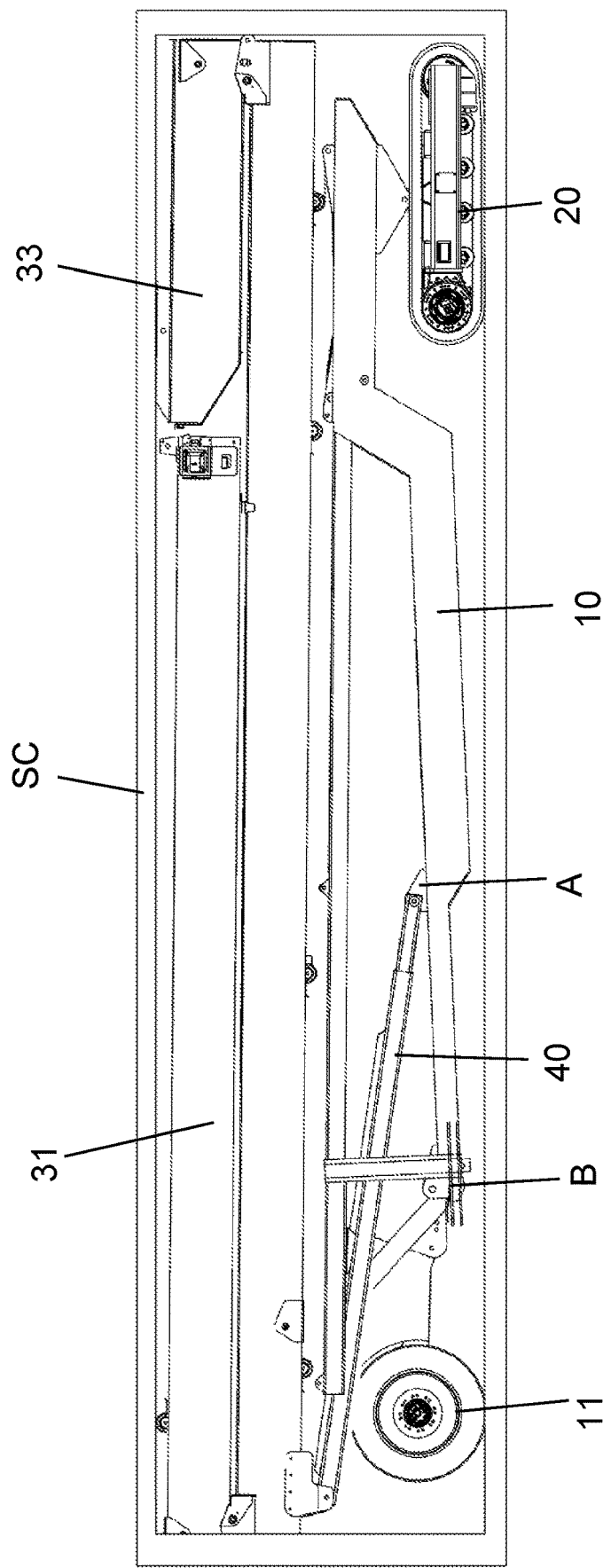
FIG. 3 shows a side view of the stacker in FIG. 1 in container mode within a 40 ft shipping container.

For transport in a single shipping container SC, telescoping cylinder leg 40 is mounted to chassis 10 in first mounting position A, preferably by pinning through frame 44. This allows the overall length of stacker 100 to be compressed to within the limits of shipping container SC. As shown in FIG. 3, when telescoping cylinder leg 40 is mounted in first mounting position A, conveyor 30 is in a substantially horizontal position.

When mounted in first mounting position A, telescoping cylinder leg 40 is for sliding conveyor 30 forwards or backwards with respect to chassis 10, e.g. parallel to chassis 10. When mounted in second mounting position B, telescoping cylinder leg 40 is for adjusting the angle of conveyor 30 such that conveyor 30 may be moved from a lowered position for transport to various raised positions for stacking operations. Leg 40 is shown mounted in second mounting position B in FIGS. 1 and 2 as well as in FIGS. 4e to 4g.

In the preferred stacker according to the invention as shown in the Figures, mid section 32 is the same length as the combined length of head section 31 and tail section 33.

FIG. 3 shows stacker 100 within 40 ft shipping container SC. Leg 40 is shown mounted in first mounting position A and conveyor 30 is folded with head section 31 and tail section 33 folded over mid section 32. FIG. 4a is simply a smaller copy of FIG. 3.

Referring now to FIGS. 4a to 4g, in order to transform stacker 100 from the container mode as shown in FIG. 3 to the working mode shown in FIG. 2, stacker 100 is first tracked from shipping container SC using its own power. Once out of the shipping container, as shown in FIG. 4b, tail section 33 of conveyor 30 stacker 100 is unfolded and hopper 50 mounted thereon as shown in FIG. 4c.

Telescopic leg 40, still mounted in first mounting position A, is then extended to move conveyor 30 horizontally along stacker 100 so that hopper 50 is above tracks 20 and head section linkage 35 is moved further away from wheels 11. As a result, the total length of stacker 100 increases. This is shown in FIG. 4d. Tail section 33 is then fixed to chassis 10 through pivot point 21 using pins.

Telescopic leg 40 is then unpinned from first mounting position A, retracted and mounted to chassis 10 at second mounting position B as shown in FIG. 4e. Stacker 100 may be transported by road when in the transport mode shown in FIG. 4e.

Once on site, head section 31 is unfolded as shown in FIG. 4f. Telescopic leg 40 is then extended to raise head section 31 to a preferred discharge height as shown in FIG. 4g and is then in working mode. FIG. 4g is simply a smaller copy of FIG. 2.

In the preferred embodiment shown in the Figures, folding conveyor 30 is approximately 78 ft (23.8 m) long with mid section 32 being approximately 39 ft (11.9 m) long, head section 31 approximately 28 ft 8" (8.75 m) long and tail section 33 approximately 10 ft 2" (3.1 m) long. However, this is not to be considered limiting and folding conveyors of at least 70 ft with sections of alternate lengths to those above are considered to be within the scope of the invention.

It is to be understood that the invention is not limited to the specific details described herein which are given by way of example only and that various modifications and alterations are possible without departing from the scope of the invention as defined in the appended claims.

The invention claimed is:

1. A stacker for stockpiling bulk material, the stacker comprising:
   a chassis provided with either wheels or tracks;
   a conveyor; and
   a powered, telescoping cylinder leg for moving the conveyor with respect to the chassis, wherein:
   the conveyor is at least 70 ft (21.3 m) long;
   the telescoping cylinder leg is mounted at one end to the conveyor and at the other end is removably mountable to the chassis from a first mounting position for transport in a shipping container to a second mounting position for transport by road;
   the conveyor is a folding conveyor comprising a head section, a mid section, and a tail section;
   the head and mid sections are pivotably connected to each other;
   the tail and mid sections are pivotably connected to each other; and
   the mid section is equal in length to a combined length of the head and tail sections.

2. The stacker of claim 1, wherein the first mounting position is located towards the centre of the chassis and the second mounting position is located at the front end of the chassis.

3. The stacker of claim 1, wherein the conveyor is approximately 78 ft (23.75 m) long.

4. The stacker of claim 1, wherein the chassis is provided with wheels at a front end thereof.

5. The stacker of claim 1, wherein the chassis is provided with tracks toward the middle thereof.

6. The stacker of claim 1, wherein the chassis is provided with wheels at a rear end thereof.

7. The stacker of claim 1, wherein the chassis is provided with tracks at a rear end thereof.

8. The stacker of claim 1, wherein the conveyor is a folding conveyor.

9. The stacker of claim 8, wherein the conveyor further comprises a fold linkage for powering the folding or unfolding of the conveyor, or both.

10. The stacker of claim 1, wherein the conveyor is a telescoping conveyor.

11. The stacker of claim 1, wherein the telescoping cylinder leg comprises two hydraulic rams.

12. The stacker of claim 1, wherein the chassis is provided with wheels and tracks.

13. The stacker of claim 1, wherein, when the telescoping cylinder leg is mounted in the first mounting position, the conveyor is in a substantially horizontal position with respect to the chassis and the telescoping cylinder leg can be extended to slide the horizontal conveyor forwards with respect to the chassis resulting in the total length of the stacker increasing.

14. The stacker of claim 1, further comprising:
   a head fold linkage for powering relative pivoting action of the head and mid sections; and
   a tail fold linkage for powering relative pivoting action of the tail and mid sections.

15. The stacker of claim 1, wherein the stacker is convertible from a transport mode, in which it fits inside 40 ft (12.2 m) shipping container, to a working mode in one hour or less without utilizing a crane.

16. A stacker for stockpiling bulk material, the stacker comprising:
   a chassis provided with either wheels or tracks;

a conveyor; and a powered, telescoping cylinder leg for moving the conveyor with respect to the chassis, wherein:

the conveyor is at least 70 ft (21.3 m) long;

the telescoping cylinder leg is mounted at one end to the conveyor and at the other end is removably mountable to the chassis from a first mounting position for transport in a shipping container to a second mounting position for transport by road;

the first mounting position is located towards the centre of the chassis;

the second mounting position is located at the front end of the chassis;

the chassis is provided with wheels at a front end thereof;

the chassis is provided with tracks at a rear end thereof;

the conveyor is a folding conveyor comprising a head section, a mid section, and a tail section;

the head and mid sections are pivotably connected to each other;

the tail and mid sections are pivotably connected to each other;

the mid section is equal in length to a combined length of the head and tail sections;

when unfolded, the conveyor is approximately 78 ft (23.75 m) long; and the stacker further comprises:

a head fold linkage for powering relative pivoting action of the head and mid sections; and a tail fold linkage for powering relative pivoting action of the tail and mid sections.

17. The stacker of claim 16, wherein the conveyor is a telescoping conveyor.

18. The stacker of claim 16, wherein the telescoping cylinder leg comprises two hydraulic rams.

19. The stacker of claim 16, wherein, when the telescoping cylinder leg is mounted in the first mounting position, the conveyor is in a substantially horizontal position with respect to the chassis and the telescoping cylinder leg can be extended to slide the horizontal conveyor forwards with respect to the chassis resulting in the total length of the stacker increasing.

20. The stacker of claim 16, wherein the stacker is convertible from a transport mode, in which it fits inside 40 ft (12.2 m) shipping container, to a working mode in one hour or less without utilizing a crane.

* * * * *